May 10, 1960 R. O. DOTY 2,936,411
TILT SENSITIVE MULTIPLE CAPACITOR DEVICE
Filed Nov. 29, 1955

INVENTOR.
ROBERT O. DOTY

United States Patent Office 2,936,411
Patented May 10, 1960

2,936,411
TILT SENSITIVE MULTIPLE CAPACITOR DEVICE

Robert O. Doty, Oxnard, Calif.

Application November 29, 1955, Serial No. 549,895

1 Claim. (Cl. 317—246)

(Granted under Title 35, U.S. Code (1952), sec. 266)

The invention described herein may be manufactured and used by or for the Government of the United States of America for governmental purposes without the payment of any royalties thereon or therefor.

The present invention relates to a tilt sensitive multiple capacitor device and more particularly to such a device employing a body of conductive liquid as the movable electrode of a capacitor and a plurality of fixed electrodes disposed adjacent to said body of liquid whereby the capacity between the movable and fixed electrodes varies in accordance with the liquid level in the device.

The invention device is sensitive to and indicates the degree of tilt thereof about its longitudinal axis, and is especially adapted for use in measuring the slope and orientation of remotely located objects. For example, such a device may be lowered into the hole created during an oil drilling operation to determine the slope of the drilling which is of great importance in such operations. Prior art devices for accomplishing this purpose have utilized mechanical linkages of various types to develop a signal indicating the tilt of the device. Such prior art devices have proved unsatisfactory due to the fact that backlash and wear are inherent in such mechanical linkages, and such mechanical arrangements are incapable of giving the desired degree of sensitivity. In addition, such prior art devices are excessively difficult to calibrate.

The present invention provides an arrangement wherein the only moving part is a body of liquid which eliminates the necessity of providing mechanical linkages and reduces the friction within the device to a minimum. A plurality of capacitors are formed between the body of liquid which serves as a movable electrode and a plurality of fixed electrodes disposed adjacent the body of liquid. Each of these capacitors is suitably connected in an electrical circuit whereby an electrical signal is developed proportional to the changes of capacity of the various capacitors, and the signals thus developed may be transmitted to a remote location which is desirable in many applications.

An object of the present invention is the provision of a new and novel tilt sensitive multiple capacitor device which eliminates the necessity of providing any mechanical linkages.

Another object of the present invention is to provide a device which is highly sensitive and which may be easily calibrated.

A further object is the provision of a tilt sensitive device which is reliable in operation, yet simple and inexpensive in construction.

Other objects and many of the attendant advantages of this invention will be readily appreciated as the same becomes better understood by reference to the following detailed description when considered in connection with the accompanying drawing wherein.

Figure 1:
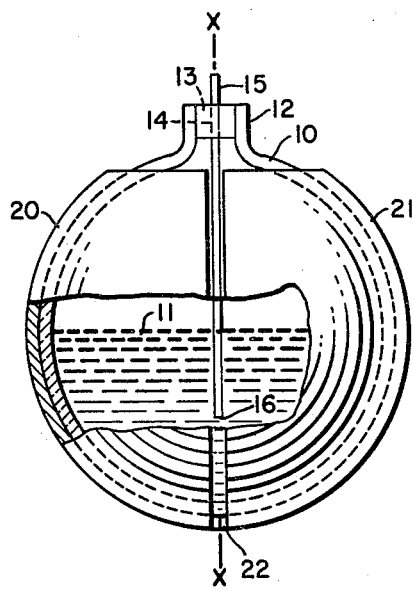
Fig. 1 is an elevation view of the invention device shown partly in cross section.

Referring now to the drawings wherein like reference characters designate similar parts throughout the several views, there is shown in Fig. 1 a substantially spherical hollow body means 10 formed of a dielectric substance such as glass or the like and having a longitudinal axis X—X about which the device is symmetrical. A body of liquid 11 is disposed within and substantially fills the lower hemispherical portion of the cavity within the body means, the liquid consisting of an electrically conductive fluid such as mercury or the like. The mercury 11 serves as the movable electrode of the capacitors of the device, and the level thereof within the body means may be varied as desired although it is considered preferable to fill the lower half of the cavity within the body member.

As shown, the body means is provided with a short neck portion 12 in which is inserted a cap member 13 formed of rubber or the like having a central opening 14 formed longitudinally therethrough. A metallic rod 15 extends through opening 14 and downward into the mercury to a point 16 such that the lower end of the rod is disposed within the liquid at all times during operation of the device within the limits of tilt which it is desired to measure. Cap 13 serves to seal the cavity within body means 10 and supports the rod 15 such that it extends along the longitudinal axis X—X of the body means.

It should be noted that the inner and outer walls of body means 10 are substantially parallel to one another, each being spherical in configuration except for the neck portion of the body means. In order to provide the desired degree of sensitivity of the device, it is necessary that the inner wall of the cavity within the body means and the outer surface of the body means be accurately formed, preferably by machining in which case the body means may be composed of two substantially hemispherical segments forming the upper and lower halves of the body means and which are suitably secured together. It is also evident that the neck portion of the body means may be eliminated in such a case and a rod 15 may be molded directly into the wall of the segment comprising the upper half of the body means.

Figure 2:
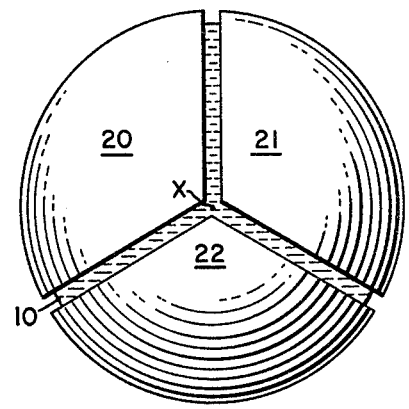
Fig. 2 is a bottom view of the device shown in Fig. 1.

As seen in Fig. 2, three similar fixed electrodes 20, 21 and 22 are secured to the outer surface of body means 10, each of these fixed electrodes terminating in an apex which is disposed adjacent the longitudinal axis of the body means at the lower portion thereof. Each of the fixed electrodes extends upwardly about the body means to a point adjacent the upper or neck portion of the body means as seen in Fig. 1. The electrodes could be extended further up along the body means, but is not considered necessary in order to give satisfactory results within the range of tilt normally measured by the device. It is evident that a capacitor is formed by each of the fixed electrodes in cooperation with the mercury within the body means and each of the fixed electrodes is spaced from the others thereof such that they are insulated from one another and are electrically independent.

Three fixed electrodes have been shown since this is the minimum number which will provide sufficient information to determine the tilt and orientation of the longitudinal axis of the device with respect to vertical. The fixed electrodes may be composed of any suitable electrically conductive substance such as thin sheets of copper which may be suitably cemented to the outer surface of the body means, or each of the fixed electrodes may be composed of a thin metallic layer sprayed on the outer surface of the body means. It is evident that any number of fixed electrodes in excess of three may be utilized in the device as desired.

Various other configurations may be utilized for the body means of the device as long as the body means remains symmetrical about its longitudinal axis, and furthermore, various other configurations of the fixed electrodes may be employed so long as the fixed electrodes remain identical in configuration and are disposed symmetrically about the longitudinal axis of the body means.

Figure 3:
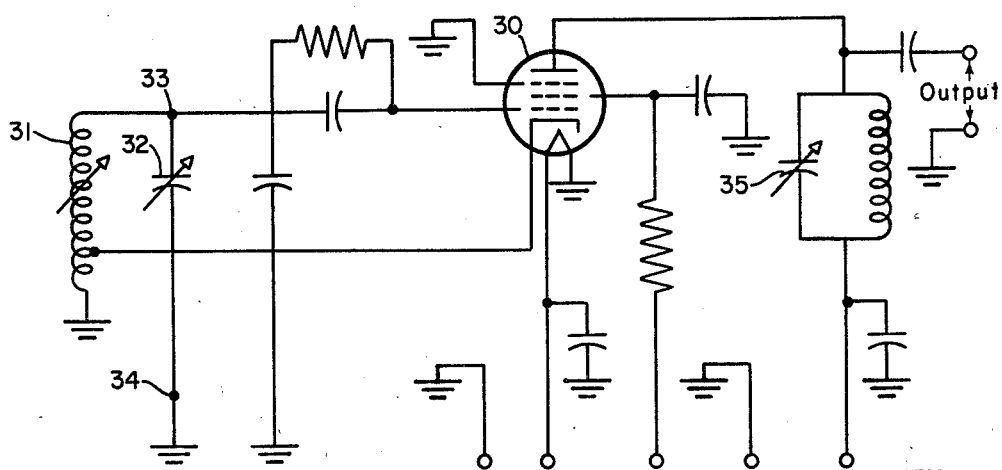
Fig. 3 is a schematic diagram of an electrical circuit adapted for use with the device illustrated in Figs. 1 and 2.

Fig. 3 illustrates a conventional Hartley type oscillator employing a pentode 30 having a frequency controlling tank circuit consisting of a variable inductance 31 and a variable capacitance 32. As used in conjunction with the device shown in Figs. 1 and 2, three such circuits as shown in Fig. 3 would be required, and in each case the capacitor designated as 32 in Fig. 3 would be replaced by one of the capacitors consisting of a fixed electrode 20, 21 or 22 and the body of liquid 11 which is in turn connected to electrode 15.

Each of the electrodes 20, 21 and 22 has a wire (not shown) suitably connected thereto, and electrode 15 also has a wire (not shown) suitably connected thereto. The aforementioned wires are utilized for connecting the electrodes of the device into the electrical circuit. For example, in replacing capacitor 32 of the circuit as shown in Fig. 3, the wire connected to electrode 20 would be connected to point 33 in the circuit, and the wire connected to electrode 15 would be connected to point 34 in the circuit, capacitor 32 and the connection thereto from points 32 and 34 being removed. In the remaining two oscillators as utilized in the device, electrode 15 in each case is connected to points 34 and electrodes 21 and 22 are connected to points 33 in the respective circuits.

Variable inductance 31 is adjusted in each of the three oscillator circuits such that the operating frequency range of the oscillators are sufficiently separated such that they may be separately received and detected. Variable capacitor 35 in each of the oscillator circuits is adjusted to the midrange of the oscillator frequency in order that the oscillator may transmit a maximum range of frequencies in accordance with the tilt of the invention device. The remaining components of the circuit shown in Fig. 3 are well known and further description thereof is not considered necessary.

It is evident that the three oscillators and the device shown in Figs. 1 and 2 may be incorporated in a compact unit when it is desired to transmit information from a remote position.

When the invention device is suitably incorporated in an electrical circuit as shown in Fig. 3, the output frequency of the circuit or various other parameters thereof may be caused to vary in accordance with variations in capacitance of the capacitors defined between the fixed electrodes 20, 21 and 22 and the body of liquid 11. The capacitance between these electrodes is directly proportional to the opposing surface area of the electrodes, and it is evident that the capacity between the electrodes will vary in accordance with and proportional to the amount of tilt of the device. The varying frequency outputs of the oscillators as shown in Fig. 3 are suitably received and detected by conventional radio receiver means and converted into varying electrical values such as voltage in a well known manner. It is apparent that the three different voltages obtained with the receiver means may be inserted into a simple computer which will provide an indication of the amount and orientation of tilt of longitudinal axis of the body means, and accordingly the slope or tilt which it is desired to be measured may be accurately determined. The receiver means may be accurately calibrated by observing and noting the variation in the received signal while measuring the tilt of the multiple capacitor device with the aid of a transit and level or other suitable instruments.

It is evident from the foregoing that there is provided a new and novel tilt sensitive multiple capacitor device which eliminates the necessity of providing any mechanical linkages and is sensitive and easily calibrated. The device is rugged and reliable in operation, yet simple and inexpensive in construction.

Obviously many modifications and variations of the present invention are possible in the light of the above teachings. It is therefore to be understood that within the scope of the appended claim the invention may be practiced otherwise than as specifically described.

I claim:

A tilt-sensitive condenser comprising a solid dielectric member essentially in the form of a hollow sphere having a normally vetrical axis of symmetry, a single body of conductive liquid partially filling said hollow sphere so as to be in contact with all that portion of the inner surface of said sphere lying below the level of said liquid, said body of liquid constituting in effect a first electrode of said condenser, a single electrically-conductive rod passing downwardly through the surface of said hollow sphere along its axis of symmetry and extending into said conductive liquid, and a plurality of second condenser electrodes electrically spaced from one another, said second electrodes being disposed on the outer surface of said hollow sphere and arranged symmetrically with respect to the said normally vertical axis thereof, each of said second electrodes being in the form of a spherical sector, with both sets of corresponding apices of such second electrodes lying along the normally vertical axis of symmetry of said hollow sphere, such that an independent capacitative relationship is established between each of said second electrodes and said first electrode formed by the body of conductive liquid.

References Cited in the file of this patent

UNITED STATES PATENTS

| 1,928,971 | Dillon | Oct. 3, 1933 |
| 2,633,028 | Fillebrown | Mar. 31, 1953 |
| 2,711,590 | Wilcox | June 28, 1955 |
| 2,825,978 | Davis | Mar. 11, 1958 |

FOREIGN PATENTS

| 223,831 | Great Britain | Oct. 30, 1924 |